United States Patent [19]
Ohki

[11] Patent Number: 6,016,795
[45] Date of Patent: Jan. 25, 2000

[54] FUEL INJECTION SYSTEM CONTROLLED BY VEHICLE LOCATION SYSTEM

[75] Inventor: Hisatomo Ohki, Gunma, Japan

[73] Assignee: Unisia Jecs Corporation, Atsugi, Japan

[21] Appl. No.: 09/112,143

[22] Filed: Jul. 9, 1998

[30] Foreign Application Priority Data

Jul. 14, 1997 [JP] Japan .................................. 9-203835

[51] Int. Cl.⁷ .................................................. F02D 41/30
[52] U.S. Cl. ........................................... 123/681; 701/213
[58] Field of Search .................................. 123/672, 478, 123/480, 406.12; 701/213, 102, 103, 104, 105

[56] References Cited

U.S. PATENT DOCUMENTS

| | | | |
|---|---|---|---|
| 4,009,375 | 2/1977 | White et al. | 235/150 |
| 5,119,102 | 6/1992 | Barnard | 342/357 |
| 5,483,945 | 1/1996 | Kobayashi et al. | 123/674 |
| 5,815,824 | 9/1998 | Saga et al. | 701/22 |
| 5,844,473 | 12/1998 | Kaman | 340/439 |

*Primary Examiner*—Willis R. Wolfe
*Assistant Examiner*—Mahmoud M. Gimie
*Attorney, Agent, or Firm*—Foley & Lardner

[57] ABSTRACT

A vehicle location system detects the location where a vehicle is position. A control system controls a fuel injection system of an engine of the vehicle in such a manner that emission of the engine varies in accordance with the detected vehicle location.

8 Claims, 9 Drawing Sheets

FIG.3

TABLE-1

| AREA | CORRECTION VALUE($\Delta P$) |
|---|---|
| CALIFORNIA | $\Delta PA$ |
| OREGON | $\Delta PB$ |
| NEVADA | $\Delta PC$ |
| ARIZONA | $\Delta PD$ |
| ⋮ | ⋮ |
| TEXAS | $\Delta PN$ |

FIG.8

TABLE-2

| AREA | CORRECTION VALUE($\Delta P$) |
|---|---|
| NATIONAL PARK AREA | $\Delta Pa$ |
| MIDTOWN AREA | $\Delta Pb$ |
| URBAN AREA | $\Delta Pc$ |
| SUBURBAN AREA | $\Delta Pd$ |
| ⋮ | ⋮ |
| MOUNTAINOUS AREA | $\Delta Pn$ |

FUEL INJECTION SYSTEM CONTROLLED BY VEHICLE LOCATION SYSTEM

BACKGROUND OF THE INVENTION

1. Field of the Invention

The present invention relates in general to fuel injection systems for automotive internal combustion engines, and more particularly to the fuel injection systems of a type which can vary or control emission of the engine in accordance with an area where the vehicle is usually used.

2. Description of the Prior Art

Hitherto, in automotive internal combustion engines, various types of fuel injection systems have been proposed and put into practical use. One of them is of a type which comprises fuel injectors for injecting fuel into intake ports of combustion chambers, an engine speed sensor for detecting the engine speed, an air flow meter for detecting the amount of air led into the engine and a processing unit which calculates an amount of fuel injected by each of the fuel injectors by processing the detected engine speed and the detected amount of intake air.

In such fuel injection system, an instruction pulse signal corresponding to the calculated injection amount of fuel is practically applied to each fuel injector to cause the same to inject a metered fuel into the corresponding combustion chamber, so that the metered fuel is appropriately mixed with the intake air in the combustion chamber and ignited by an ignition plug to produce a high combustion pressure in the combustion chamber. With this, a desired torque is outputted from a crankshaft of the engine. In the processing unit, by processing the detected engine speed and the detected intake air amount, a basic amount of injected fuel is calculated. In practice, with reference to the calculated basic amount of injected fuel, the amount of fuel actually injected into each combustion chamber is so controlled that the air/fuel mixture of the engine shows a stoichiometric ratio (for example, $\lambda=14.7$). Usually, with this control, the output and emission characteristics of the engine are improved.

Regarding emission standards of motor vehicles, the regulation value changes depending on the area where the vehicle is practically used, that is, for example, between an urban area and a rural area, between a midtown area and a suburban area, between Japan and USA, etc.,. Accordingly, hitherto, for each type of motor vehicles, the fuel injection system thereof has had a hardware and a software which are exclusively designed for clearing the emission regulation value of the area where the vehicle is usually used. Thus, when the vehicle is thereafter planed to be used in other area, it becomes necessary to change the hardware and the software of the fuel injection system of the engine, which is troublesome and requires modifying costs.

In fact, in case of motor vehicles used in California of USA where a very severe regulation of exhaust gas has been adopted, the fuel injection system for the vehicles has been designed to give priority to emission reduction over power of the vehicles. This means that the fuel injection system for the vehicles used in California needs a specialized designing and thus increases manufacturing costs.

SUMMARY OF THE INVENTION

It is therefore an object of the present invention to provide a fuel injection system for automotive internal combustion engines, which is free of the above-mentioned drawbacks.

According to the present invention, there is provided a fuel injection system for automotive internal combustion engines, which automatically sets the fuel injection mode suited to the area where the vehicle is being used, by using the technique of a global positioning system (GPS) or the like.

According to a first aspect of the present invention, there is provided a control system of an engine mounted in a motor vehicle. The control system comprises first means for detecting the position where the vehicle is located; and second means for controlling emission of the engine in accordance with the vehicle position detected by the first means.

According to a second aspect of the present invention, there is provided, in a motor vehicle powered by an internal combustion engine equipped with a fuel injection system, a control system of the fuel injection system. The control system comprises an engine speed sensor issuing a fist signal representing a rotation speed of the engine; an air flow meter issuing a second signal representing the amount of air flowing in the intake port; an oxygen sensor issuing a third signal representing the condition of an exhaust gas from the engine; a vehicle location detecting device issuing a fourth signal representing the location where the vehicle is positioned; and a control unit which, by processing the first, second, third and fourth signals, calculates a desired amount of fuel injected by the fuel injector.

BRIEF DESCRIPTION OF THE DRAWINGS

Other objects and advantages of the present invention will become apparent from the following description when taken in conjunction with the accompanying drawings, in which:

FIG. 3 is a data table used in the first embodiment, showing correction values set for various States of America;

FIG. 8 is a data table used in the second embodiment, showing correction values set for various areas;

DETAILED DESCRIPTION OF THE EMBODIMENTS

Figure 1:
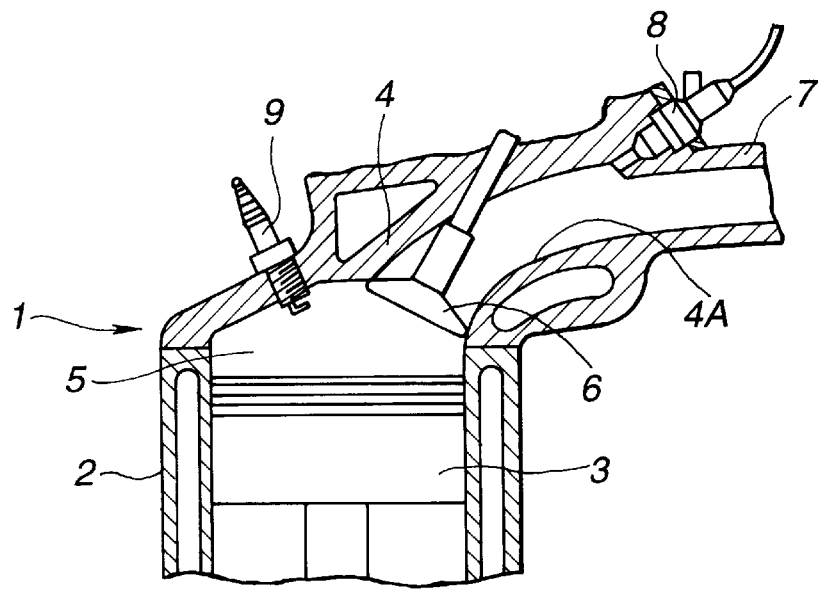
FIG. 1 is a partial sectional view of an internal combustion engine employed in the present invention.

In FIG. 1, there is partially shown an internal combustion engine 1 to which the present invention is practically applied.

The engine 1 comprises generally a cylinder 2, a piston 3, a cylinder head 4, a cylinder block (not shown), a crankcase (not shown) and a crankshaft (not shown), which are assembled in known manner. In the cylinder 2, there is defined a combustion chamber 5 between the piston 3 and the cylinder head 4. The cylinder head 4 defines therein an intake port 4A and an exhaust port (not shown) which are communicated with the combustion chamber 5. The intake port 4A is selectively closed and opened by an intake valve 6 installed therein and the exhaust port is selectively closed and opened by an exhaust valve (not shown) installed therein.

Designated by numeral 7 is an intake passage leading to the intake port 4A, which is defined by an intake manifold. Thus, under operation of the engine 1, fresh air is led into the combustion chamber 5 through the intake passage 7 and the intake port 4A. Designated by numeral 8 is a fuel injector which is arranged to inject fuel into the intake port 4A toward the combustion chamber 5. As will be described in detail hereinafter, when an instruction pulse signal is applied to an energizing coil of the fuel injector 8, a metered fuel is injected into the intake port 4A from the fuel injector 8. Although not shown in the drawing, the fuel is pumped to the fuel injector 8 through a fuel pump.

Designated by numeral 9 is an ignition plug which is mounted to the cylinder head 4 to ignite, with the aid of an ignition coil (not shown), a fuel-air mixture led into the combustion chamber 5. With the ignition, the mixture is combusted to produce a high combustion pressure in the combustion chamber 5. The ignition plug 9 and the ignition coil constitute an ignition device 10 (see FIG. 2).

Referring to FIGS. 2 to 6 of the accompanying drawings, there is shown a first embodiment of the present invention.

Figure 2:
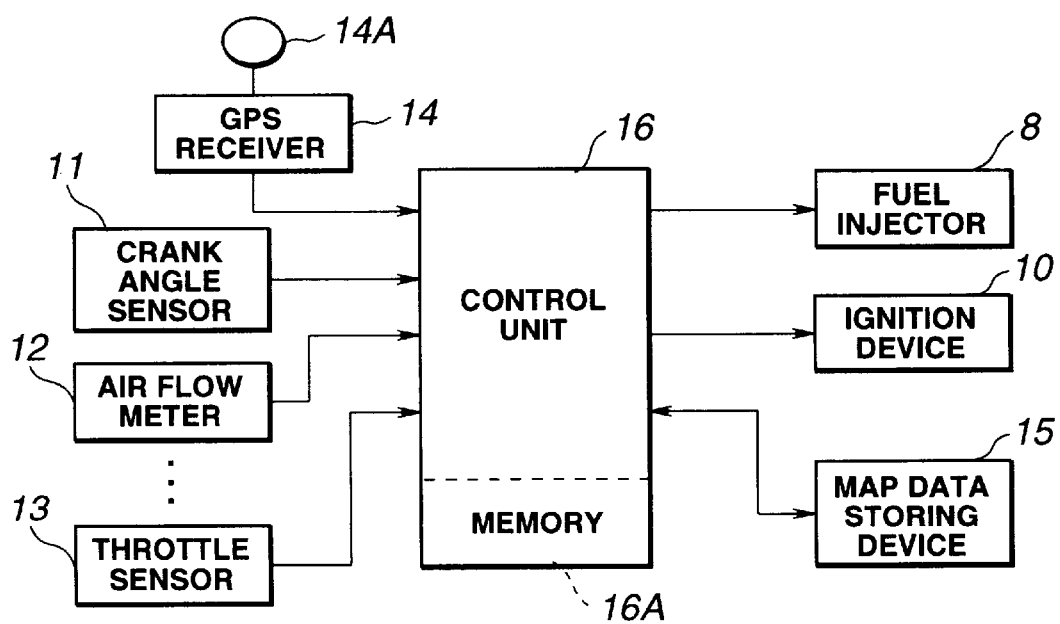
FIG. 2 is a block diagram showing an arrangement of a first embodiment of the invention.

In FIG. 2, there is shown a block diagram of the fuel injection system of the first embodiment. Designated by numeral 11 is a crank angle sensor which issues a signal representing a rotation speed "N" of the engine 1. The signal is also used for determining the ignition timing of the ignition plug 9. Designated by numeral 12 is an air flow meter which detects the amount "Q" of air flowing in the intake passage 7. Designated by numeral 13 is a throttle sensor which issues a signal representing an angle by which a throttle valve (not shown) is turned. Thus, by processing these signals, whether the engine 1 is under idling condition, acceleration condition or deceleration condition can be monitored. As shown, the information signals from the crank angle sensor 11, the air flow meter 12 and the throttle sensor 13 are all led into a control unit 16. Although not shown in the drawing, information signal from an oxygen sensor installed in an exhaust system of the engine 1 is led into the control unit 16. Designated by numeral 14 is a GPS receiver which receives, through an antenna 14A thereof, vehicle position information signals from GPS satellites (not shown) and outputs the same to the control unit 16. Designated by numeral 15 is a map data storing device which is for example a CD-ROM (viz., ROM disc). The information provided by the CD-ROM is a digital data for making the positioning system more reliable and accurate. That is, the map data is used for displaying a map on a screen, which is matched to the area where the vehicle is located.

The control unit 16 is a microcomputer which generally comprises a CPU (viz., central processing unit), RAM (viz., random access memory), ROM (viz., read only memory) and input and output interfaces. A memory section of the control unit 16 is designated by 16A. As shown, instruction signals produced by the control unit 16 are led to the fuel injector 8, the ignition device 10 and the map data storing device 15. The memory section 16A stores contents of the TABLE-1 shown in FIG. 3 and programmed operation steps depicted by the flowcharts of FIGS. 4, 5 and 6.

The TABLE-1 is designed for motor vehicles used in United States of America. As shown, the table provides a correction value ΔPA, ΔPB, ΔPC, APD . . . or ΔPN which is added to a predetermined equation for calculating the amount of injected fuel needed by each State of America. The emission regulation value changes at every State.

For example, when the vehicle is to be used in California, the correction value ΔPA is selected for having the engine 1 produce emission matched with the emission regulation of the State. Specifically, by selecting the correction value ΔPA, the amount of fuel injected by each fuel injector 8 is so determined as to produce a leaner air/fuel mixture with respect to the stoichiometric air/fuel ratio. While, when the vehicle is to be used in Texas, the correction value ΔPN is selected for having the engine 1 produce emission matched with the emission regulation of the State. That is, by selecting the correction value ΔPN, the amount of fuel injected by each fuel injector 8 is so determined as to produce a richer air/fuel mixture with respect to the stoichiometric air/fuel ratio.

In the following, operation of the fuel injection system of the first embodiment will be described with reference to flowcharts of FIGS. 4, 5 and 6.

Figure 4:
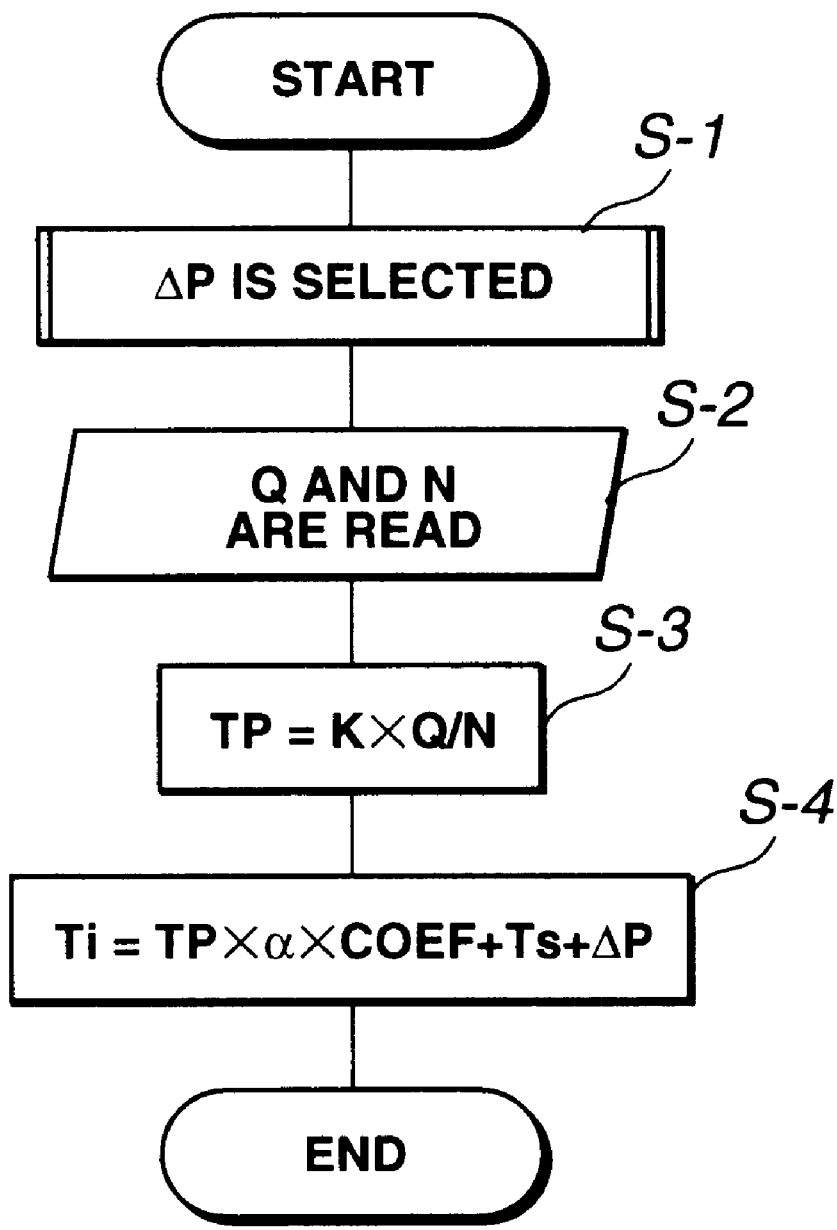
FIG. 4 is a flowchart showing programmed operation steps executed by a control unit of the first embodiment for calculating the amount of fuel injected.

FIG. 4 is a flowchart showing programmed operation steps executed by the control unit 16 for calculating the amount of fuel injected by each fuel injector 8.

At step S-1, one of the correction values ΔPA, ΔPB, ΔPC, ΔPD . . . , and ΔPN of TABLE-1 (FIG. 3) is selected. This selection is achieved by executing the processes of the flowcharts of FIGS. 5 and 6 which will be described hereinafter. At step S-2, the amount "Q" of air flowing in the intake passage 7 and the rotation speed "N" of the engine 1 are read. Then, at step S-3, the following calculation is executed for obtaining a basic amount "TP" of injected fuel.

$$TP = K \times Q/N \quad (1)$$

wherein:

K=constant

At step S-4, the following calculation is executed for obtaining an amount "Ti" of fuel actually injected by each fuel injector 8 during operation of the engine 1.

$$Ti = TP \Delta \alpha \times COEF + TS + \Delta P \quad (2)$$

wherein:

α=correction factor caused by air/fuel ratio feedback control

TS=correction factor caused by voltage

COEF=correction factor caused by others

Thus, when an instruction pulse signal corresponding to the amount "Ti" is applied to each fuel injector 8, the injector 8 injects a desired amount "Ti" of fuel into the corresponding intake port 4A.

Figure 5:
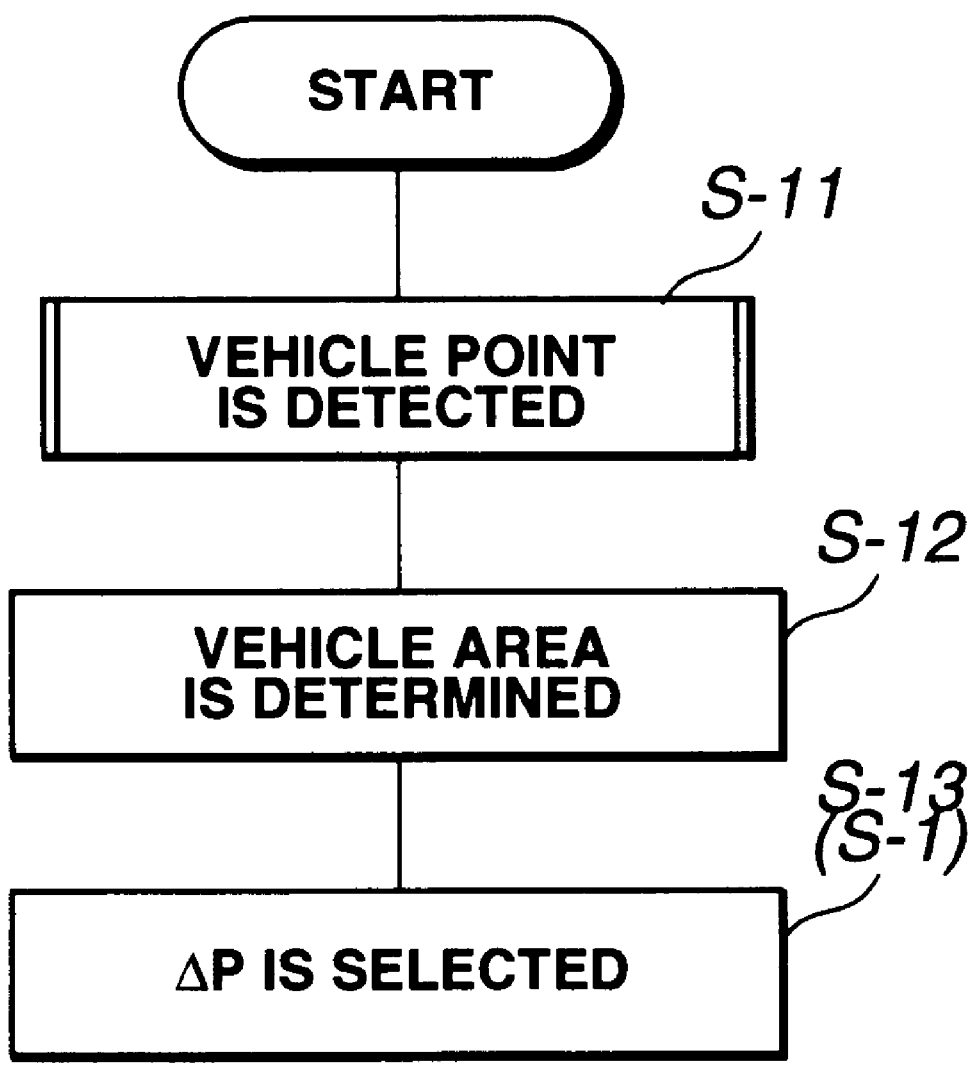
FIG. 5 is a flowchart showing programmed operation steps executed by the control unit for selecting the correction value.

FIG. 5 is a flowchart showing programmed operation steps executed by the control unit 16 for selecting one of the correction values ΔPA, ΔPB, ΔPC, ΔPD . . . , and ΔPN of TABLE-1 (FIG. 3).

At step S-11, the latitude and longitude of a point where the vehicle is positioned are detected. This detection is achieved by executing the process of the flowchart of FIG. 6 which will be described hereinafter. At step S-12, by collating the detected point to the map provided by the map data storing device 15, the area, that is, California, Oregon, . . . or Texas, where the vehicle is located is determined. That is, for example, when the detected point is situated in lat. 38° N and long. 123° E (which is the point of San Francisco), the determination is so made that the vehicle is in California. At step S-13, by using the TABLE-1, the correction value ΔP of the determined area is selected. That is, if the determined area is California, the correction value ΔPA is selected and stored in the memory section 16A of the control unit 16. After step S-13, the operation flow goes to step S-1 of the flowchart of FIG. 4.

Figure 6:
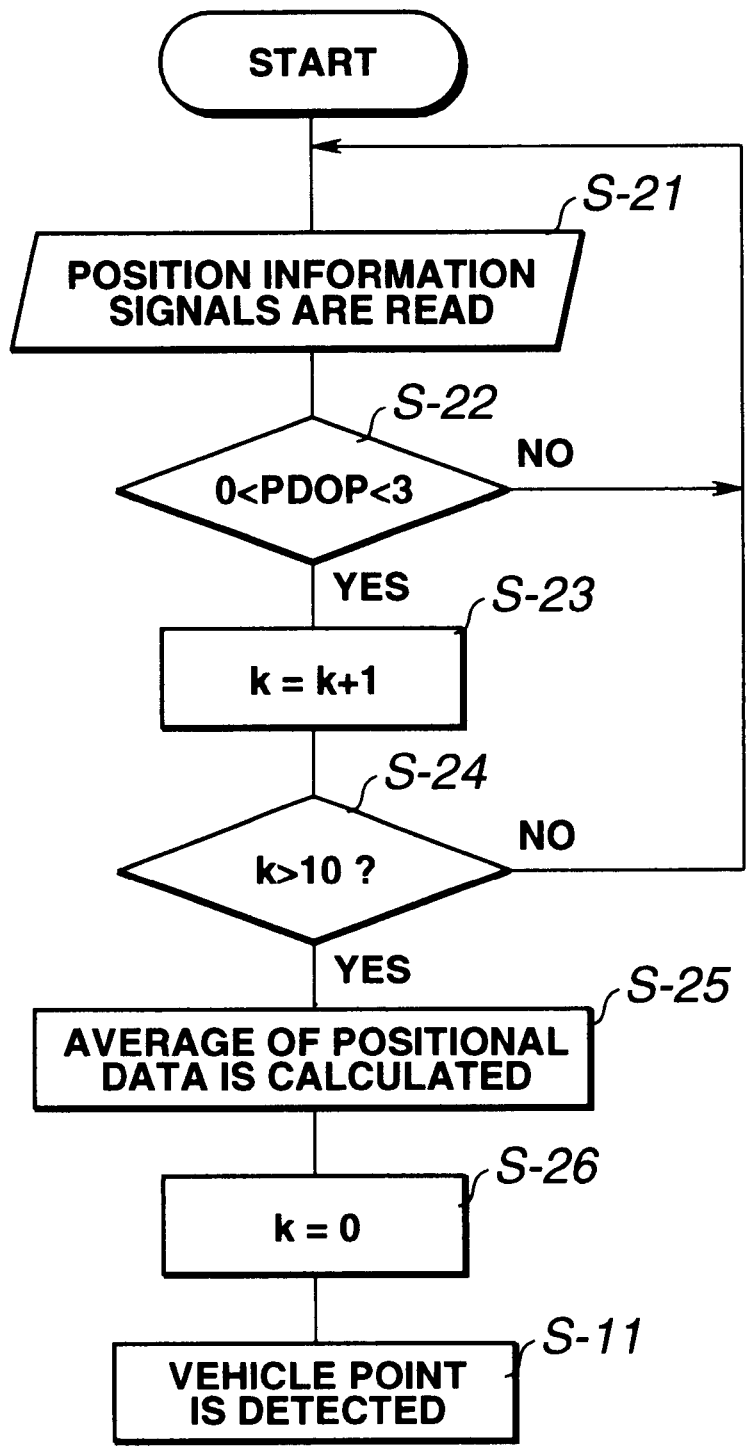
FIG. 6 is a flowchart showing programmed operation steps executed by the control unit for detecting the point where the vehicle is positioned.

FIG. 6 is a flowchart showing programmed operation steps executed by the control unit 16 for detecting the exact point (viz., latitude and longitude of the point) where the vehicle is located.

At step S-21, position information signals from GPS satellites are read to calculate the latitude and longitude of a point where the vehicle is located. Then, at step S-22, the following inequality is executed for checking whether the accuracy lowering degree "PDOP" of the position information signals is within an allowable range or not.

$$0 < PDOP < 3 \quad (3)$$

If NO, that is, when the degree "PDOP" fails to satisfy the inequality (3), the operation flow goes back to step S-21. While, if YES, that is, when the degree "PDOP" satisfies the inequality (3), the operation flow goes to step S-23. At this step, "1" (viz., one) is added to an existing count value "k", and then at step S-24, judgment is carried out as to whether the existing count value "k" is greater than "10" (viz., ten) or not. If NO, that is, when the existing count value "k" is smaller than "10", the operation flow goes back to step S-21. While, if YES, that is, when the existing count value "k" is greater than "10", the operation flow goes to step S-25. At this step, an average of the ten latitude values and that of the ten longitude values are calculated, that is to say, the exact point of the vehicle is derived and stored in the memory section 16A of the control unit 16. Then, at step S-26, the count value "k" is reset, that is, set to "0" (zero). After step S-26, the operation flow goes to step S-11 of the flowchart of FIG. 5.

As is described hereinabove, in the first embodiment of the present invention, by using the global positioning system (GPS), the exact point where the vehicle is located is detected, and by collating the detected point of the vehicle to the map provided by the map data storing device, the area where the vehicle is located is determined, and by using the data table "TABLE-1" of FIG. 3, the collection value ΔP of the determined area is selected. Then, by using the selected collection value ΔP, the amount "Ti" of fuel actually injected by each fuel injector 8 is derived, and by applying a corresponding instruction pulse signal to the fuel injector 8, a desired amount "Ti" of fuel is injected from the injector 8 to the corresponding intake port 4A of the engine 1.

Accordingly, each time the vehicle runs into a new area, the fuel injection system forces the engine of the vehicle to produce emission which is matched with the emission regulation of the new area. That is, for example, when the vehicle is running in California, the engine keeps producing emission matched with the regulation of California. While, when the vehicle runs through Arizona, New Mexico and Texas, the engine of the vehicle is automatically tuned successively to produce emission which is matched with the regulations of these States one after another.

Referring to FIGS. 7 to 10 of the drawings, there is shown a second embodiment of the present invention. Substantially same parts and devices as those of the above-mentioned first embodiment are denoted by the same numerals and detailed explanation of those parts will be omitted for simplification of description.

As will become apparent as the description proceeds, in the second embodiment, for detecting the exact point where the vehicle is located, a stand-alone positioning system is used in addition to the global positioning system (GPS). Furthermore, the data table used in the second embodiment is designed to use the fuel injection system in more limited areas where emission regulations are also set.

Figure 7:
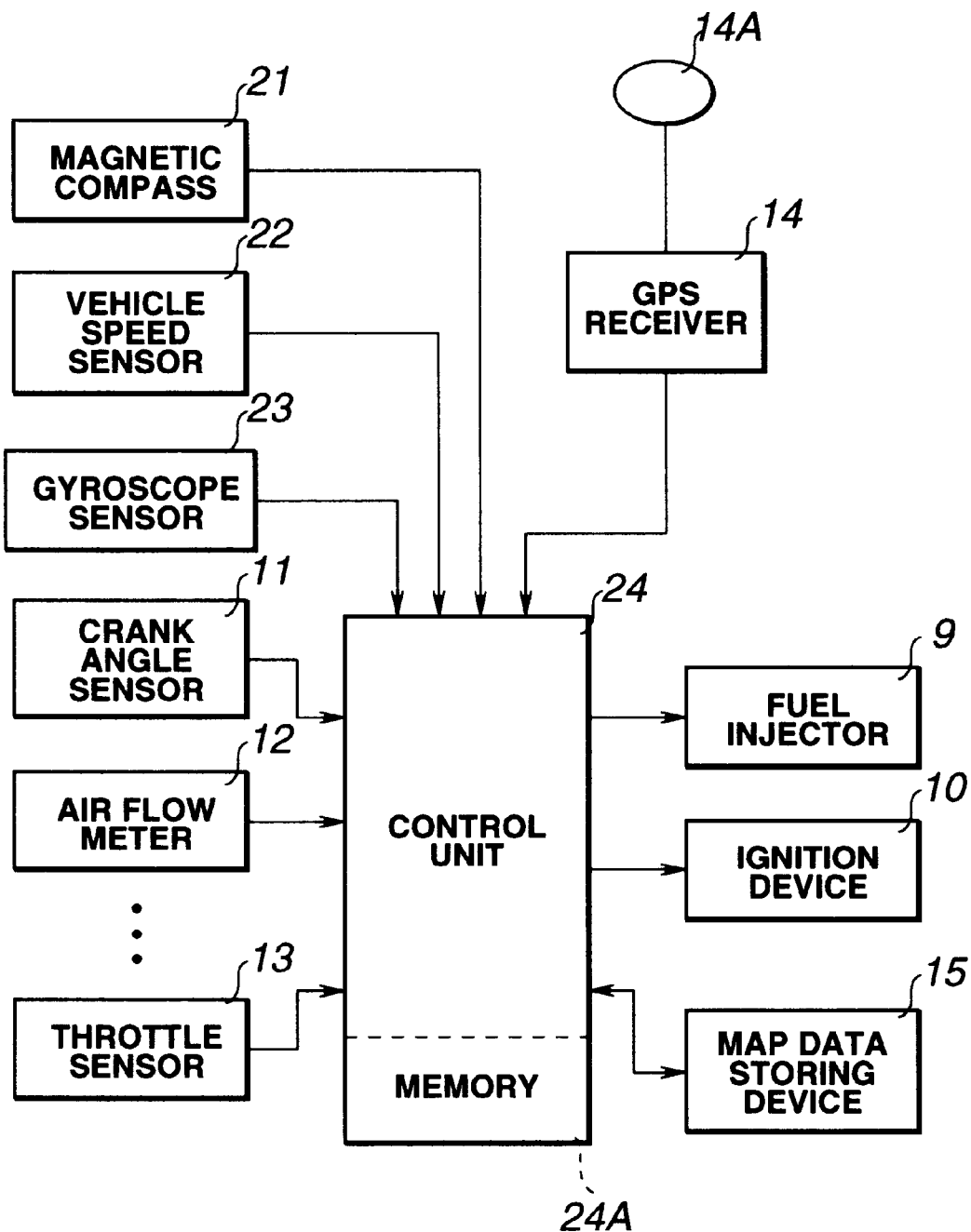
FIG. 7 is a block diagram showing an arrangement of a second embodiment of the present invention.

In FIG. 7, there is shown a block diagram of the fuel injection system of the second embodiment. Designated by numeral 21 is a magnetic compass which always detects a reference direction (viz., magnetic north). By processing azimuthal data given by the magnetic compass, the direction to which the vehicle faces is determined. Designated by numeral 22 is a vehicle speed sensor which is mounted near a road wheel of the vehicle. By integrating a vehicle speed sensed by the sensor 22, a moved distance of the vehicle is derived. Designated by numeral 23 is a gyroscope sensor which senses angular velocity of the vehicle when the vehicle is turned. By integrating the angular velocity, an angular displacement of the vehicle is derived. The magnetic compass 21, the vehicle speed sensor 22 and the gyroscope sensor 23 constitute part of a stand-alone positioning system.

Designated by numeral 24 is a control unit which comprises a microcomputer. A memory section of the control unit 24 is designated by numeral 24A. Information signals from the crank angle sensor 11, the air flow meter 12, the throttle sensor 13, the oxygen sensor (not shown), the GPS receiver 14, the magnetic compass 21, the vehicle speed sensor 22, gyroscope sensor 23 and the map data storing device 15 are led into an input section of the control unit 24. While, instruction signals from an output section of the control unit 24 are led to each fuel injector 9, the ignition device 10 and the map data storing device 15. The memory section 24A of the control unit 24 stores contents of the TABLE-2 shown in FIG. 8 and programmed operation steps depicted by the flowcharts of FIGS. 4, 5, 9 and 10.

The TABLE-2 is designed for motor vehicles used in more limited areas where emission regulations are also set. These areas are national park area, midtown area, urban area, suburban area, mountainous area, etc.,. As shown, the table provides a correction value ΔPa, ΔPb, ΔPc, ΔPd . . . or ΔPn which is added to a predetermined equation for calculating the amount of injected fuel needed by each area.

In the following, operation of the fuel injection system of the second embodiment will be described.

For calculating the amount of fuel injected by each fuel injector 8 and selecting one of the correction values ΔPa, ΔPb, ΔPc, ΔPd . . . , and ΔPn of TABLE-2, substantially. same operation steps as those of the above-mentioned flowcharts of FIGS. 4 and 5 are executed by the control unit 24.

Figure 9:
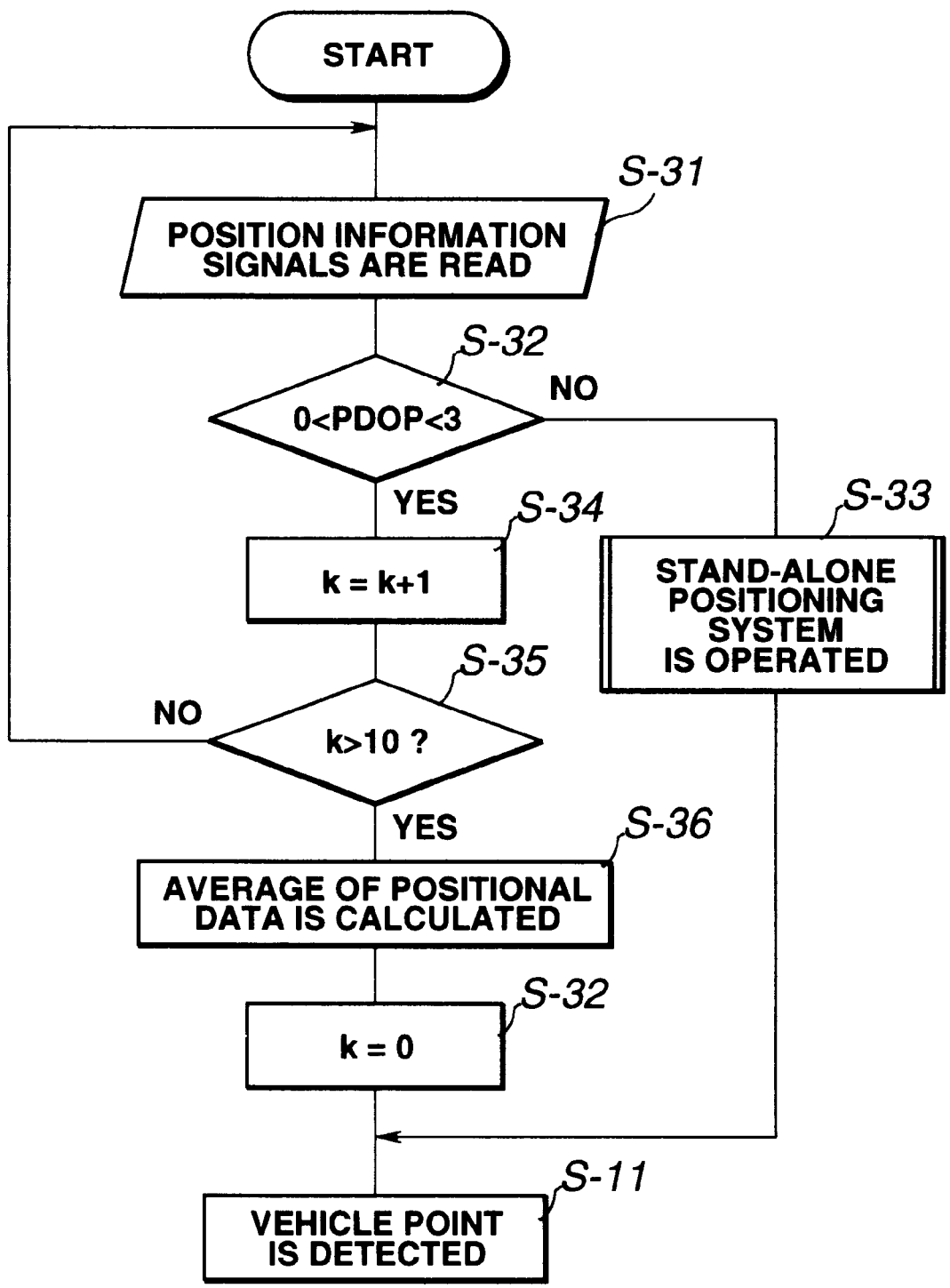
FIG. 9 is a flowchart showing programmed operation steps executed by a control unit of the second embodiment for detecting the point of the vehicle by practically using a global positioning system.
Figure 10:
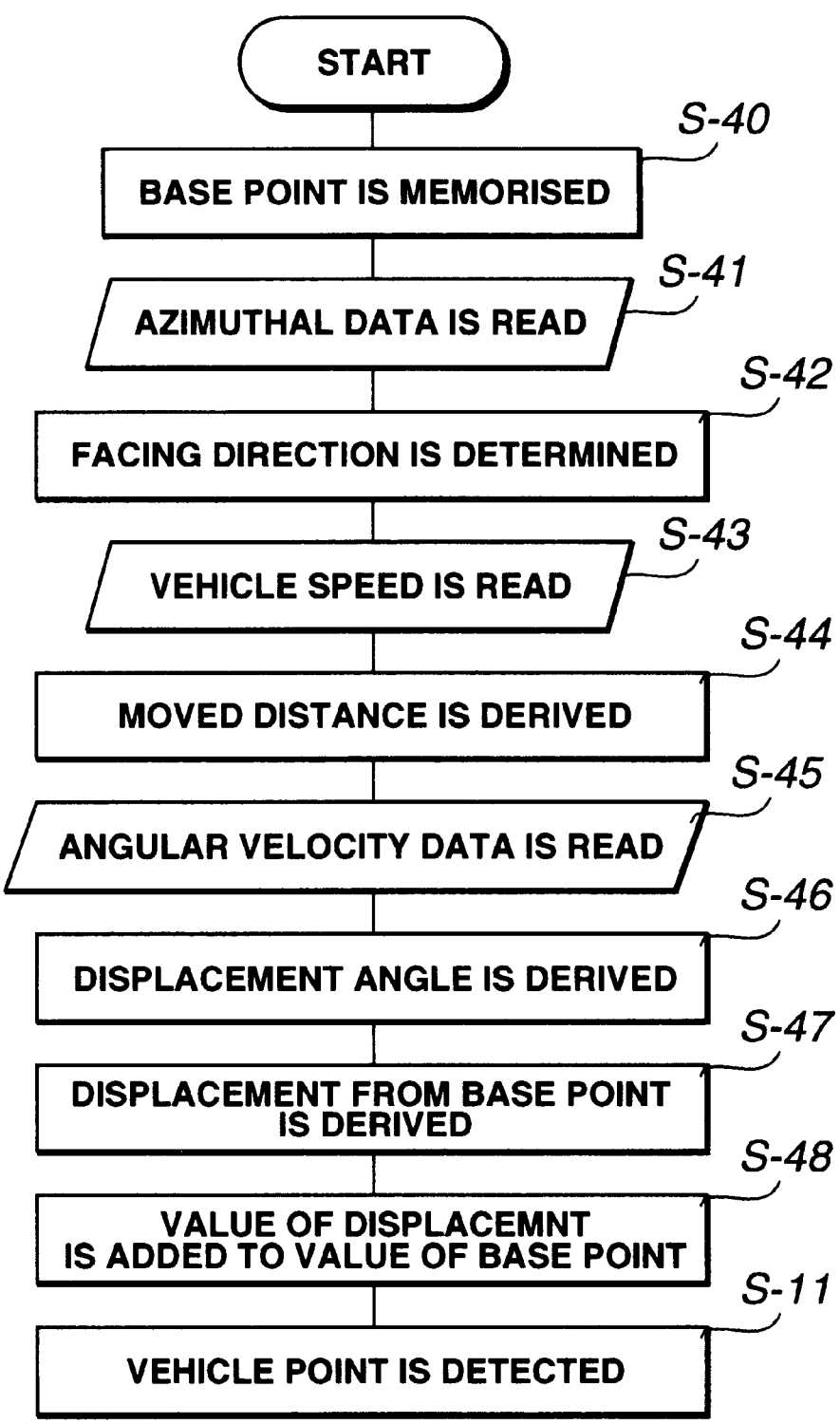
FIG. 10 is a flowchart showing programmed operation steps executed by the control unit for detecting the point of the vehicle by practically using a stand-alone positioning system.

In addition, operation steps depicted by the flowcharts of FIGS. 9 and 10 are executed by the control unit 24 in the second embodiment.

FIG. 9 is a flowchart showing programmed operation steps executed by the control unit 24 for detecting the point (viz., latitude and longitude of the point) of the vehicle by using the global positioning system (GPS).

At step S-31, position information signals from GPS satellites are read to calculate the latitude and longitude of a point where the vehicle is located. Then, at step S-32, the afore-mentioned inequality (3) is executed for checking whether the accuracy lowering degree "PDOP" of the position information signals is within an allowable range or not. If NO, that is, when the degree "PDOP" fails to satisfy the inequality (3), the operation flow goes to step S-33, judging that the number of the satellites is too small to obtain a precise position detection. At this step S-33, an aftermentioned stand-alone positioning system is practically operated. After step S-33, the operation flow goes to step S-11 of the flowchart of FIG. 5. While, if YES at step S-32, that is, when the degree "PDOP" satisfies the inequality (3), the operation flow goes to step S-34, judging that the number of the satellites is satisfied. At this step, "1" (viz., one) is added to an existing count value "k", and then at step S-35, judgement is carried out as to whether the existing count value "k" is greater than "10" (viz., ten) or not. If NO, that is, when the existing count value "k" is smaller than "10", the operation flow goes back to step S-31. While, if YES, the operation flow goes to step S-36. At this step, an average of the ten latitude values and that of the ten longitude values are calculated, that is to say, the existing point of the vehicle is derived and stored in the memory section 24A of the control unit 24. Then, at step S-37, the count value "k" is reset, that is, set to "0" (zero). After step S-37, the operation flow goes to step S-11 of the flowchart of FIG. 5.

FIG. 10 is a flowchart showing programmed operation steps executed by the control unit 24 for detecting the point of the vehicle by using the stand-alone positioning system. As is described hereinabove, these steps are executed when the judgment of step S-32 of the flowchart of FIG. 9 issues NO answer.

At step S-40, a base point of the vehicle which has been detected just before issuance of NO judgement at the step S-32 is memorized. At step S-41, azimuthal data given by the magnetic compass 21 is read, and at step S-42, by processing the aximuthal data, a facing direction that is the direction to which the vehicle faces is determined. At step S-43, a vehicle speed sensed by the vehicle speed sensor 22 is read, and at step S-44, by integrating the vehicle speed, a moved distance of the vehicle is derived. At step S-45, an angular velocity data sensed by the gyroscope sensor 23 is read, and at step S-46, by integrating the angular velocity, a displacement angle of the vehicle is derived. At step S-47, by processing the abovementioned facing direction, moved distance and displacement angle, a displacement of the vehicle from the base point is derived, and at step S-48, the value of the displacement is added to the value of the base point to derive the existing point of the vehicle and stored in the memory section 14A of the control unit 24. After step S-48, the operation flow goes to step S-11 of the flowchart of FIG. 5.

As is described hereinabove, in the second embodiment of the invention, by using the stand-alone positioning system as well as the global positioning system (GPS), the point where the vehicle is located is detected, and by collating the detected point of the vehicle to the map provided by the map data storing device, the area where the vehicle is located is determined, and by using the data table "TABLE-2" of FIG. 8, the collection value ΔP of the determined area is selected. Then, by using the selected collection value ΔP, the amount "Ti" of fuel actually injected by each fuel injector 8 is derived, and by applying a corresponding instruction pulse signal to the fuel injector 8, a desired amount "Ti" of fuel is injected from the injector 8 to the corresponding intake port 4A of the engine 1.

Accordingly, each time the vehicle runs into a new area, the fuel injection system forces the engine of the vehicle to produce emission which is matched with the emission regulation of the new area. That is, for example, when the vehicle is running in the urban area, the engine keeps producing emission matched with the regulation of the urban area. While, when the vehicle runs into the suburban area, the engine of the vehicle is automatically tuned to produce emission which is matched with the regulation of the suburban area.

Furthermore, in the second embodiment, due to usage of the stand-alone positioning system, the existing point of the vehicle can precisely detected even when the vehicle is running in a tunnel.

If desired, in place of the above-mentioned global positioning system and stand-alone positioning system, a terrestrial radio positioning system may be used for detecting the existing point of the vehicle.

It is to be understood that, although the invention has been described with specific reference to particular embodiments thereof, it is not to be so limited since changes and alternations therein may be made within the full intended scope of this invention as defined by the appended claims.

What is claimed is:

1. A fuel injection control system for controlling an amount of fuel injected through a fuel injector to be fed to an internal combustion engine mounted on a motor vehicle, comprising:

an engine speed sensor issuing a rotation speed signal representing a rotation speed of the engine;

an air flow meter issuing an air amount signal representing an amount of air fed to the engine;

a basic fuel amount deriving unit that derives, in accordance with said rotation speed and air amount signals, a basic fuel amount to be injected by said fuel injector;

a vehicle position detecting device that issues a vehicle position signal representing the position where the vehicle is positioned;

a correction value deriving unit that derives, in accordance with said vehicle position signal, a correction value for said basic fuel amount; and a correction unit that corrects said basic fuel amount in accordance with said correction value.

2. A fuel injection control system as claimed in claim 1, wherein said basic fuel amount deriving unit calculates the basic fuel amount in such a manner that an air/fuel mixture actually led into each combustion chamber of the engine shows a stoichiometric air/fuel ratio, and wherein said correction value deriving unit calculates the correction value in such a manner as to cause the air/fuel mixture to have a richer or leaner air/fuel ratio with respect to said stoichiometric ratio.

3. A fuel injection control system as claimed in claim 2, wherein said correction value deriving unit comprises:

an area determining section that, based on the vehicle position signal and map data, determines an area where the vehicle is actually located;

a correction value storing section that stores a plurality of correction values for a plurality of areas; and a correction value selecting section that selects one of the correction values in accordance with the determined area.

4. A fuel injection control system as claimed in claim 1, wherein said vehicle position detecting device is at least one of a global positioning system (GPS), a stand-alone positioning system and a terrestrial radio positioning system.

5. A fuel injection control system as claimed in claim 1, wherein said vehicle position detecting device comprises a global positioning system (GPS) and a stand-alone positioning system.

6. A fuel injection control system as claimed in claim 1, wherein said correction unit corrects said basic fuel amount in such a manner as to have the engine produce emission that varies strictly in accordance with said vehicle position signal.

7. A fuel injection system as claimed in claim 1, wherein said fuel injector is arranged to inject fuel into an intake port of the engine.

8. A fuel injection control system as claimed in claim 1, wherein said vehicle position detecting device comprises:
- a vehicle location system that detects a terrestrial point where the vehicle is positioned; and
- a map data storing device that stores a plurality of terrestrial areas one of which includes the terrestrial point detected by said vehicle location system.

* * * * *